(12) United States Patent
Miyaji

(10) Patent No.: US 7,909,010 B2
(45) Date of Patent: Mar. 22, 2011

(54) INTAKE PIPE OF INTERNAL COMBUSTION ENGINE

(75) Inventor: Yoshihiro Miyaji, Toyota (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 406 days.

(21) Appl. No.: 12/063,121

(22) PCT Filed: Sep. 4, 2006

(86) PCT No.: PCT/JP2006/317928
§ 371 (c)(1),
(2), (4) Date: Feb. 7, 2008

(87) PCT Pub. No.: WO2007/029839
PCT Pub. Date: Mar. 15, 2007

(65) Prior Publication Data
US 2009/0101099 A1    Apr. 23, 2009

(30) Foreign Application Priority Data
Sep. 7, 2005   (JP) ................... 2005-259188

(51) Int. Cl.
*F02M 35/10* (2006.01)
(52) U.S. Cl. .................. 123/184.21; 123/184.31
(58) Field of Classification Search ............ 123/184.21, 123/184.28–184.52
See application file for complete search history.

(56) References Cited

U.S. PATENT DOCUMENTS

| 4,545,331 | A | 10/1985 | Ito et al. |
| 5,170,754 | A | 12/1992 | Urabe |
| 6,609,492 | B2 * | 8/2003 | Naik ................. 123/295 |

FOREIGN PATENT DOCUMENTS

| EP | 0 352 820 A2 | 1/1990 |
| JP | 7-19132 A | 1/1995 |
| JP | 10-196474 A | 7/1998 |
| JP | 2003-201930 A | 7/2003 |
| JP | 2003-307159 A | 10/2003 |
| JP | 2004-124778 A | 4/2004 |

* cited by examiner

*Primary Examiner* — Noah Kamen
(74) *Attorney, Agent, or Firm* — Sughrue Mion, PLLC

(57) ABSTRACT

An intake pipe of an internal combustion engine includes a main flow passage allowing air introduced into the engine to flow therethrough, an upper branch flow passage branching off from the main flow passage and communicating with #2 cylinder, #4 cylinder, and #6 cylinder, a lower branch flow passage branching off from the main flow passage and communicating with #1 cylinder, #3 cylinder, and #5 cylinder, and a partition wall allowing the upper branch flow passage and the lower branch flow passage to be apart. The partition wall has an end portion that faces the main flow passage. The end portion is formed of a spherical surface. With such a configuration, the intake pipe of the internal combustion engine, which intake pipe provides sufficient improvement in intake efficiency, is provided.

6 Claims, 5 Drawing Sheets

INTAKE PIPE OF INTERNAL COMBUSTION ENGINE

TECHNICAL FIELD

The present invention relates to an intake pipe of an internal combustion engine, and more particularly to an intake pipe of an internal combustion engine, which intake pipe is applied to a V-type six-cylinder engine.

BACKGROUND ART

As to a conventional intake pipe of an internal combustion engine, Japanese Patent Laying-Open No. 7-19132, for example, discloses an intake device for a V-type engine intended for changing the direction of an opening by reducing a protrusion amount of an upper stream side intake channel above the engine and by avoiding interference with a cylinder head cover. In this document, the intake device is mounted on a transversely-installed V-type six-cylinder engine where a front bank and a rear bank are installed in a V-shape, each of the front bank and the rear bank being formed of a cylinder group including cylinders whose intake strokes do not occur successively. The intake device has a surge tank having a two-tiered structure. At the surge tank, an upper surge tank communicating with the rear bank and a lower surge tank communicating with the front bank are integrally formed.

In the V-type six-cylinder engine disclosed in the above-described document, an intake stroke alternately occurs at the front bank and the rear bank, and hence an airflow that flows back and forth between the upper surge tank and the lower surge tank in the surge tank is generated. However, if the air does not flow smoothly when it moves around an end portion of a partition wall that allows the upper and lower surge tanks to be apart, improvement in intake efficiency of the engine may be hindered.

DISCLOSURE OF THE INVENTION

An object of the present invention is to overcome the problem above, and provide an intake pipe of an internal combustion engine, the intake pipe providing sufficient improvement in intake efficiency.

An intake pipe of an internal combustion engine according to the present invention includes: a main flow passage allowing air introduced into the internal combustion engine to flow therethrough; a first branch flow passage branching off from the main flow passage and communicating with a first cylinder group; a second branch flow passage branching off from the main flow passage and communicating with a second cylinder group; and a partition wall allowing the first branch flow passage and the second branch flow passage to be apart. The partition wall has an end portion facing the main flow passage. The end portion is formed of a spherical surface.

With the intake pipe of the internal combustion engine formed as such, the intake air from the main flow passage moves from one to the other of the first and second cylinder groups, and thereby an airflow is generated between the first branch flow passage and the second branch flow passage. At that time, the end portion of the partition wall is formed of a spherical surface, and hence it is possible to allow the air moving around the end portion and flowing from one to the other of the first and second branch flow passages to flow smoothly. It is therefore possible to provide sufficient improvement in intake efficiency of the internal combustion engine.

The partition wall further has a base portion extending on a side opposite to the main flow passage with respect to the end portion. Preferably, the spherical surface forming the end portion continues to the base portion at a boundary location between the end portion and the base portion. With the intake pipe of the internal combustion engine formed as such, it is possible to allow the air to flow smoothly at a location where the air flows around the end portion to further flow from the end portion to the base portion. It is thereby possible to more effectively improve intake efficiency of the internal combustion engine.

The partition wall further has a base portion extending on a side opposite to the main flow passage with respect to the end portion, and having a substantially constant thickness T. The end portion has a thickness t larger than the thickness T. Thicknesses T and t are lengths of the base portion and the end portion, respectively, in a direction along which the first branch flow passage and the second branch flow passage are arranged. With the intake pipe of the internal combustion engine formed as such, it is possible to allow the airflow to smoothly flow between the first and second branch flow passages, and ensure a large flow passage area in each of the first and second branch flow passages.

The partition wall further has a base portion extending on a side opposite to the main flow passage with respect to the end portion. Preferably, the end portion is formed of a member different from the base portion, and attached to the base portion. With the intake pipe of the internal combustion engine formed as such, the end portion formed of a spherical surface is a member different from the base portion, which makes it possible to simplify a process of manufacturing the intake pipe.

The intake pipe is formed by resin molding. Preferably, a first molded portion including the end portion and a second molded portion molded separately from the first molded portion are combined to form the intake pipe. With the intake pipe of the internal combustion engine formed as such, the first molded portion including the end portion is molded separately from the second molded portion, so that it is possible to eliminate constraints imposed on a demolding process in resin molding, the constraints being caused by the shape of the end portion. It is therefore possible to simplify the process of manufacturing the intake pipe.

The intake pipe of the internal combustion engine is mounted on a V-type six-cylinder engine provided with a first bank having the first cylinder group formed thereat and a second bank having the second cylinder group formed thereat, the first cylinder group including cylinders discontinuous in terms of firing order and the second cylinder group including cylinders discontinuous in terms of firing order.

With the intake pipe of the internal combustion engine formed as such, an intake stroke alternately occurs in the first bank and the second bank, and hence an airflow that flows back and forth between the first branch flow passage and the second branch flow passage is frequently generated. Therefore, in a V-type six-cylinder engine having the intake pipe according to the present invention mounted thereon, any of the effects described above can more effectively be obtained.

As described above, according to the present invention, it is possible to provide an intake pipe of an internal combustion engine, the intake pipe providing sufficient improvement in intake efficiency.

BEST MODES FOR CARRYING OUT THE INVENTION

Figure 1:
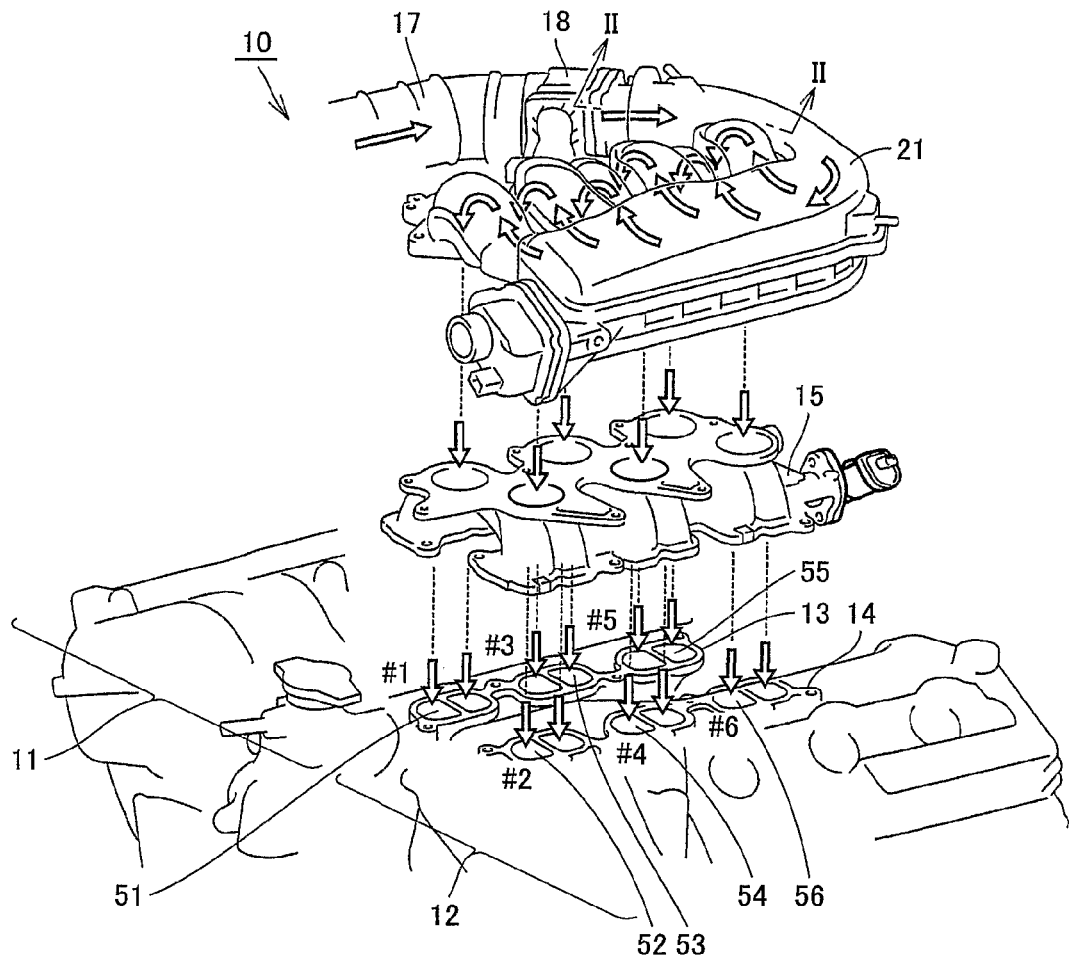
FIG. 1 is an exploded view showing an engine to which an intake pipe according to an embodiment of the present invention is applied.

An embodiment of the present invention will be described with reference to the drawings. In the drawings to be referred to below, the same or corresponding members are denoted by the same numbers.

FIG. 1 is an exploded view showing an engine to which an intake pipe according to the embodiment of the present invention is applied. Referring to FIG. 1, an intake pipe according to the present embodiment is applied to a vehicle gasoline engine 10, which is a V-type six-cylinder engine (hereinafter referred to as engine 10). Engine 10 includes a right bank 11 and a left bank 12 arranged in a V-shape.

Cylinders denoted by numbers #1, #3 and #5, respectively (hereinafter referred to as #1 cylinder, #3 cylinder, and #5 cylinder), are formed at right bank 11 in a row in this order from the front side to the rear side of the vehicle. Cylinders denoted by numbers #2, #4 and #6, respectively (hereinafter referred to as #2 cylinder, #4 cylinder, and #6 cylinder), are formed at left bank 12 in a row in this order from the front side to the rear side of the vehicle.

In the present embodiment, engine 10 is mounted in a longitudinal direction such that each bank extends from the forward to backward direction of the vehicle. However, engine 10 may be mounted in a transverse direction such that each bank extends in a width direction of the vehicle.

The firing order of engine 10 is #1 cylinder, #2 cylinder, #3 cylinder, #4 cylinder, #5 cylinder, #6 cylinder, #1 cylinder and so on. In other words, each of the cylinder groups formed at right bank 11 and left bank 12, respectively, is formed of a plurality of cylinders discontinuous in terms of firing order. In this case, an intake stroke alternately occurs at right bank 11 and left bank 12.

Right bank 11 is provided with a cylinder head 13. Intake ports 51, 53 and 55 that communicate with #1 cylinder, #3 cylinder, and #5 cylinder, respectively, are formed at cylinder head 13. Left bank 12 is provided with a cylinder head 14. Intake ports 52, 54 and 56 that communicate with #2 cylinder, #4 cylinder, and #6 cylinder, respectively, are formed at cylinder head 14.

An intake manifold 15 is fixed to cylinder heads 13 and 14. A surge tank 21 is fixed to intake manifold 15 on a side opposite to cylinder heads 13 and 14. Surge tank 21 is connected to an air intake not shown by means of a hose 17, which air intake takes in outside air. At a location where surge tank 21 and hose 17 are connected, an electronically-controlled throttle body 18 is installed.

Surge tank 21 divides the air taken in from the air intake for distributing the same to each of #1 cylinder to #6 cylinder, and allows the air to flow toward intake manifold 15. Intake manifold 15 introduces the air flowing from surge tank 21 into intake ports 51 to 56. In the present embodiment, intake manifold 15 is made of an aluminum alloy, while surge tank 21 is made of a resin material.

Figure 2:
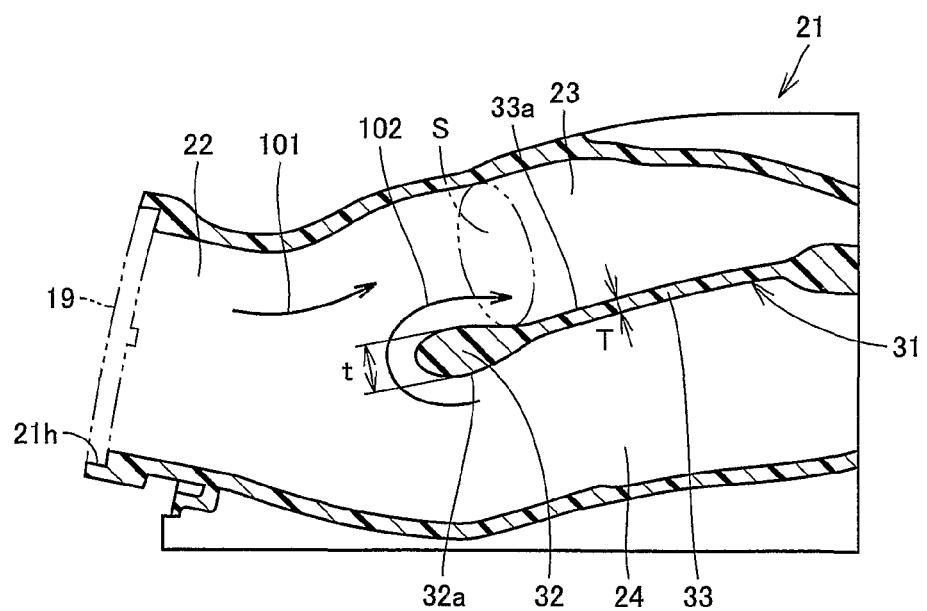
FIG. 2 is a cross sectional view of a surge tank along a line II-II in FIG. 1.

FIG. 2 is a cross sectional view of the surge tank along a line II-II in FIG. 1. Referring to FIGS. 1 and 2, surge tank 21 has an opening 21h that communicates with hose 17. The air flowing into surge tank 21 initially passes through opening 21h. Opening 21h is provided with a throttle valve 19, which is controlled to have an appropriate opening position by electronically-controlled throttle body 18 receiving a driver's operation of an accelerator or the like.

In surge tank 21, a main flow passage 22 extending approximately linearly from opening 21h, and an upper branch flow passage 23 and a lower branch flow passage 24 both branching off from main flow passage 22 and extending in a curved manner, are formed. A partition wall 31 formed integrally with surge tank 21 allows upper branch flow passage 23 and lower branch flow passage 24 to be apart.

Upper branch flow passage 23 and lower branch flow passage 24 are arranged in an up-down direction, with partition wall 31 interposed therebetween. Partition wall 31 divides an air-flowing space in surge tank 21 into two subspaces, and forms upper branch flow passage 23 and lower branch flow passage 24 in a prescribed section from main flow passage 22 to the cylinders. Main flow passage 22 extends between opening 21h and partition wall 31. Main flow passage 22 is formed on an upstream side of the airflow flowing from the air intake to each of the cylinders, while upper branch flow passage 23 and lower branch flow passage 24 are formed on a downstream side of the airflow flowing from the air intake to each of the cylinders.

For example, upper branch flow passage 23 communicates with intake ports 52, 54 and 56 through intake manifold 15, while lower branch flow passage 24 communicates with intake ports 51, 53 and 55 through intake manifold 15. In other words, air that flows through main flow passage 22 passes through upper branch flow passage 23 to be introduced into #2 cylinder, #4 cylinder, and #6 cylinder formed at left bank 12, and passes through lower branch flow passage 24 to be introduced into #1 cylinder, #3 cylinder, and #5 cylinder formed at right bank 11.

Partition wall 31 has an end portion 32 provided at a location that faces main flow passage 22, and a base portion 33 that continues from end portion 32 and allows upper branch flow passage 23 and lower branch flow passage 24 to be apart on a side opposite to main flow passage 22 with respect to end portion 32. Each of upper branch flow passage 23 and lower branch flow passage 24 starts at a location where end portion 32 is provided, and extends toward a location where base portion 33 is provided.

End portion 32 has a surface 32a formed of a spherical surface. Base portion 33 has a surface 33a formed of a planar surface. Surfaces 32a and 33a partially define upper branch flow passage 23 and lower branch flow passage 24.

At a cross-sectional location shown in FIG. 2, where cross sections of main flow passage 22, upper branch flow passage 23, and lower branch flow passage 24 appear all together, partition wall 31 has a teardrop-like cross sectional shape, the shape being rounded at end portion 32. Surface 32a smoothly continues to surface 33a in a curved manner, and there is no edge portion at a boundary location between surface 32a and surface 33a. Surface 32a may be formed of a spherical surface in an area facing at least main flow passage 22.

Base portion 33 is formed into a plate having a substantially constant thickness T. End portion 32 has a maximum thickness t larger than thickness T. Thicknesses T and t are lengths of base portion 33 and end portion 32, respectively, in an up-down direction along which upper branch flow passage 23 and lower branch flow passage 24 are arranged.

For example, engine 10, which is a V-type six-cylinder engine, has a timing in which, when an intake stroke of #1 cylinder is about to terminate at right bank 11, an intake stroke of #2 cylinder, which has a firing order next to #1 cylinder, is in progress at left bank 12. At that time, an airflow (an airflow shown by an arrow 102) flowing from lower branch flow passage 24, which has just served for the intake stroke of #1 cylinder, to upper branch flow passage 23 communicating with #2 cylinder, and an airflow (an airflow shown by an arrow 101) flowing from main flow passage 22 to upper branch flow passage 23, are generated simultaneously.

When the intake stroke of #2 cylinder is then about to terminate, an airflow flowing from upper branch flow passage 23, which has just served for the intake stroke of #2 cylinder, to lower branch flow passage 24 communicating with #3 cylinder, which has a firing order next to #2 cylinder, and an airflow flowing from main flow passage 22 to lower branch flow passage 24, are generated simultaneously. As such, in engine 10, which is a V-type six-cylinder engine, an airflow that flows back and forth between upper branch flow passage 23 and lower branch flow passage 24 is generated, and its flow direction is inverted whenever the intake stroke occurs in different cylinders.

Figure 3:
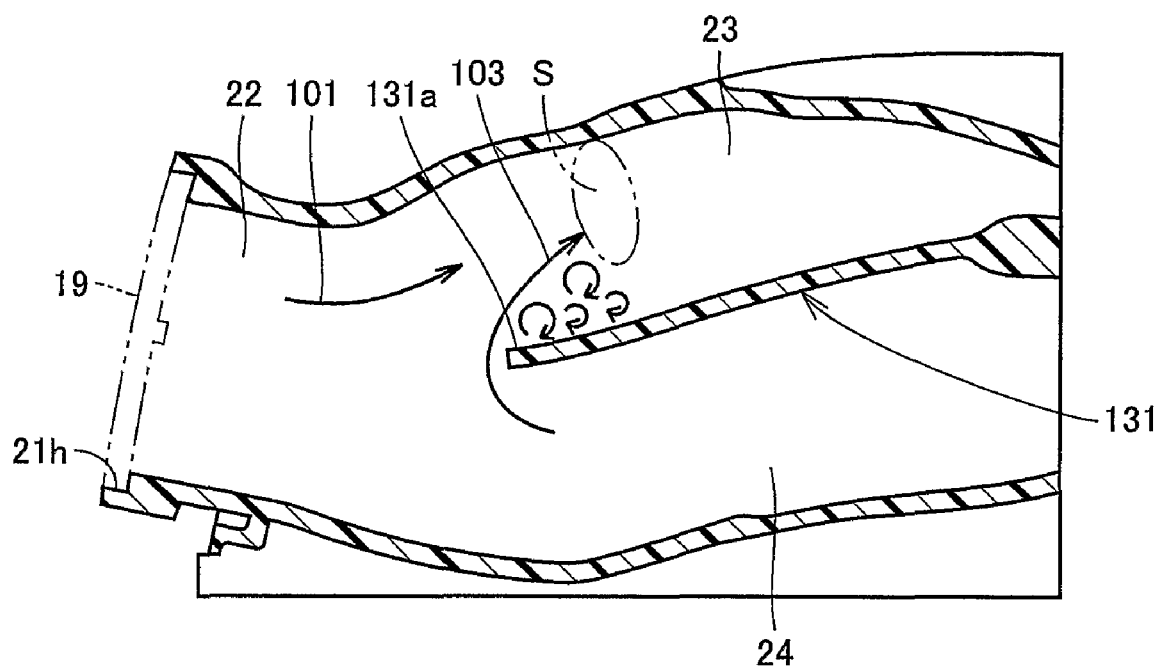
FIG. 3 is a cross sectional view showing a conventional example of the shape of a partition wall of the surge tank.

FIG. 3 is a cross sectional view showing a conventional example of the shape of the partition wall of the surge tank. Referring to FIG. 3, a partition wall 131 that allows upper branch flow passage 23 and lower branch flow passage 24 to be apart is simply formed into a plate in the conventional example, in order to form the surge tank with a compact shape and simplify the manufacturing process. Therefore, the end portion of partition wall 131 is formed to include a square-cornered, edge-like portion having a cornered cross section.

In this case, assume, for example, an airflow that flows from lower branch flow passage 24 to upper branch flow passage 23. When air flowing along a surface 131a of partition wall 131 moves around the end portion of partition wall 131, it becomes discontinuous at the edge portion. The airflow therefore causes separation in upper branch flow passage 23, resulting in an area of a flow having a viscosity on surface 131a. Accordingly, the air mainly flows through an area apart from surface 131a, as shown by an arrow 103, and hence an effective flow passage area S in upper branch flow passage 23 is decreased.

In contrast, referring to FIG. 2, surface 32a of end portion 32 is formed of a spherical surface in the present embodiment. It is therefore possible to allow the air that moves around end portion 32 of partition wall 31 to flow along surface 32a in a continuous manner, which can prevent the separation of the airflow in upper branch flow passage 23. In the present embodiment, surface 32a continues to surface 33a in a curved manner, and hence it is also possible to prevent the separation when the air moves from surface 32a to surface 33a. It is therefore possible to increase effective flow passage area S in upper branch flow passage 23.

Additionally, in the present embodiment, end portion 32 is formed to have maximum thickness t larger than thickness T of base portion 33. Accordingly, the air moving around end portion 32 can flow from lower branch flow passage 24 to upper branch flow passage 23 along surface 32a, by drawing a smoother curve. It is therefore possible to effectively prevent the separation of an airflow. In contrast, base portion 33 is formed to have a thickness smaller than that of end portion 32, and hence it is possible to ensure a large flow passage area of the air in each of upper branch flow passage 23 and lower branch flow passage 24.

There has been described an airflow flowing from lower branch flow passage 24 to upper branch flow passage 23. However, the same applies to the airflow flowing from upper branch flow passage 23 to lower branch flow passage 24.

Figure 4A:
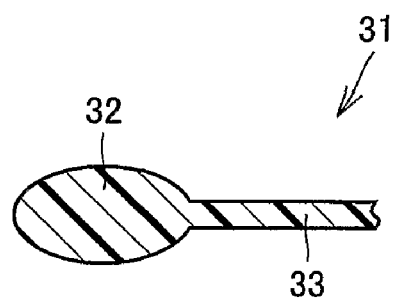
FIG. 4A is a cross sectional view showing a first modification of the partition wall formed in the surge tank in FIG. 2.
Figure 4B:
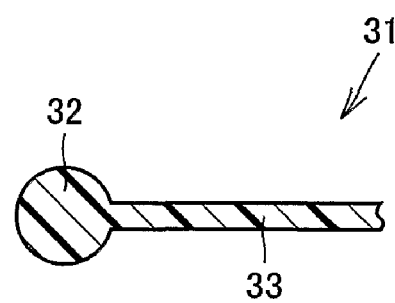
FIG. 4B is a cross sectional view showing the first modification of the partition wall formed in the surge tank in FIG. 2.

Each of FIGS. 4A and 4B shows a cross sectional view showing a first modification of the partition wall formed at the surge tank in FIG. 2. Referring to FIGS. 4A and 4B, end portion 32 of partition wall 31 has an oval or circular cross sectional shape in the present modification. In this case, the separation of the air flowing around end portion 32 can also be prevented in upper branch flow passage 23 or lower branch flow passage 24.

Figure 5A:
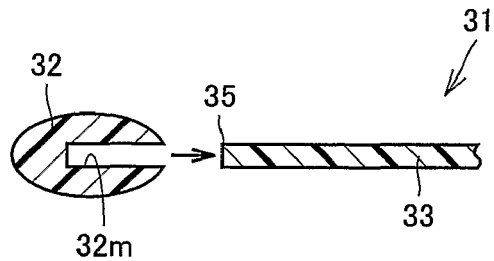
FIG. 5A is a cross sectional view showing a second modification of the partition wall formed in the surge tank in FIG. 2.
Figure 5B:
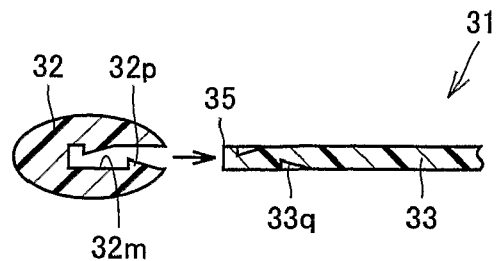
FIG. 5B is a cross sectional view showing the second modification of the partition wall formed in the surge tank in FIG. 2.
Figure 6:
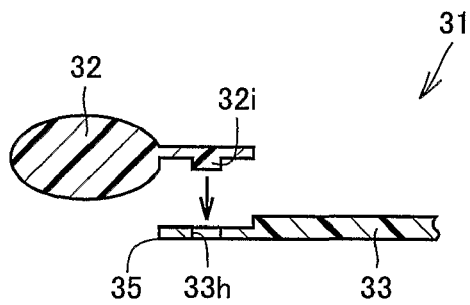
FIG. 6 is a cross sectional view showing a third modification of the partition wall formed in the surge tank in FIG. 2.

Each of FIGS. 5A and 5B shows a cross sectional view showing a second modification of the partition wall formed at the surge tank in FIG. 2. FIG. 6 is a cross sectional view showing a third modification of the partition wall formed at the surge tank in FIG. 2. In the modifications shown in FIGS. 5A, 5B and 6, end portion 32 of partition wall 31 is formed of a material such as plastic or rubber, and is molded separately from surge tank 21.

In the example shown in FIG. 5A, a groove portion 32m is formed at end portion 32. Groove portion 32m is fitted into a tip portion 35 of base portion 33 molded integrally with surge tank 21, and thereby end portion 32 is fixed to base portion 33. In the example shown in FIG. 5B, a convex portion 32p is further molded in an integral manner at an inner wall of groove portion 32m. A concave portion 33q is formed at tip portion 35 of base portion 33. While groove portion 32m is fitted into tip portion 35, convex portion 32p is engaged in concave portion 33q, so that base portion 33 and end portion 32 are firmly fixed.

In the example shown in FIG. 6, a protruding portion 32i is molded at end portion 32, while a hole 33h is formed at tip portion 35 of base portion 33, which tip portion 35 is to overlap end portion 32. Protruding portion 32i is fitted into hole 33h, and thereby end portion 32 is fixed to base portion 33.

If surge tank 21 is formed by resin molding, there may be a case where end portion 32 having a thickness larger than that of base portion 33 cannot be molded integrally, in terms of demolding. According to the modifications shown in FIGS. 5A, 5B and 6, end portion 32 is fabricated by being molded separately from surge tank 21, and hence it is possible to circumvent such a case.

Figure 7:
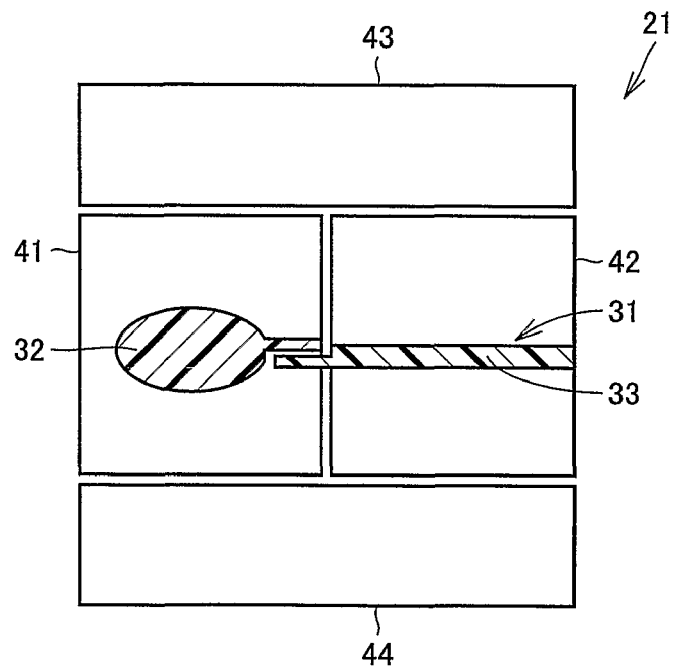
FIG. 7 is a cross sectional view showing an example of a resin molding process of the surge tank in FIG. 2.

FIG. 7 is a cross sectional view showing an example of a resin molding process of the surge tank in FIG. 2. Referring to FIG. 7, when surge tank 21 is formed by resin molding, a molded piece 41 including end portion 32, a molded piece 42 including base portion 33, and molded pieces 43 and 44 placed above and under molded pieces 41 and 42, may be fabricated by separate molding, and these molded pieces may be integrated by heat seal to complete surge tank 21. In this case, it is possible to eliminate constraints imposed on demolding in resin molding, the constraints being caused by the shape of end portion 32.

Figure 8:
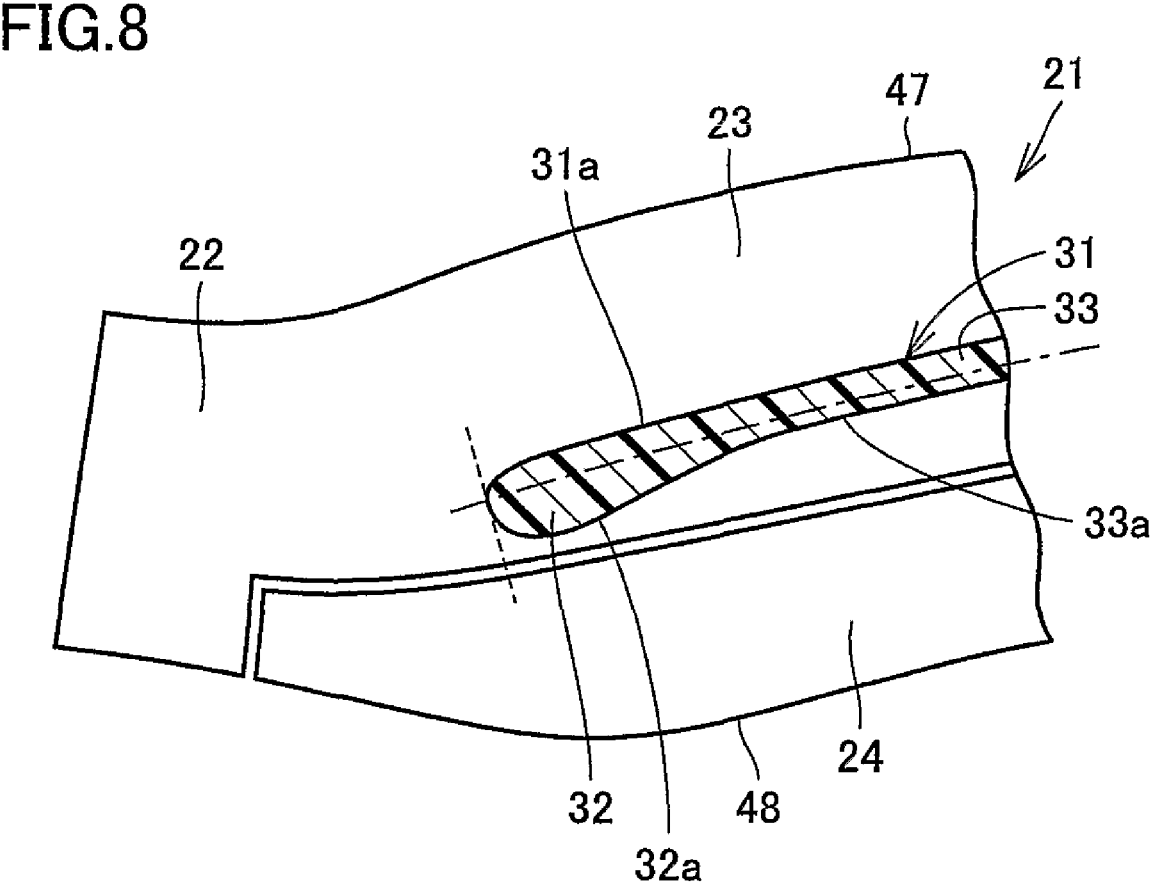
FIG. 8 is a cross sectional view showing another example of the resin molding process of the surge tank in FIG. 2.

FIG. 8 is a cross sectional view showing another example of a resin molding process of the surge tank in FIG. 2. Referring to FIG. 8, when a molded piece 47 including partition wall 31 and upper branch flow passage 23, and a molded piece 48 including lower branch flow passage 24, are integrated to fabricate surge tank 21, a surface 31a of partition wall 31 may be made into a planar surface on a side facing upper branch flow passage 23, while a surface 32a of end portion 32 may be curved to protrude from a surface 33a of base portion 33 on a side facing lower branch flow passage 24. In this case, it is possible to minimize constraints imposed on demolding in resin molding of molded piece 47, the constraints being caused by the shape of end portion 32.

The intake pipe of engine 10 serving as the internal combustion engine in the embodiment of the present invention, includes main flow passage 22 allowing air introduced into engine 10 to flow therethrough, upper branch flow passage 23 serving as a first branch flow passage branching off from main flow passage 22 and communicating with #2 cylinder, #4 cylinder, and #6 cylinder serving as a first cylinder group, lower branch flow passage 24 serving as a second branch flow passage branching off from main flow passage 22 and communicating with #1 cylinder, #3 cylinder, and #5 cylinder serving as a second cylinder group, and partition wall 31 allowing upper branch flow passage 23 and lower branch flow passage 24 to be apart. Partition wail 31 has end portion 32 that faces main flow passage 22. End portion 32 is formed of a spherical surface. #2 cylinder, #4 cylinder, and #6 cylinder, which form the first cylinder group, and #1 cylinder, #3 cylinder, and #5 cylinder, which form the second cylinder group, are continuous in firing order, respectively.

The intake pipe of engine 10 is mounted on a V-type six-cylinder engine provided with left bank 12 serving as a first bank where #2 cylinder, #4 cylinder, and #6 cylinder are formed, and right bank 11 serving as a second bank where #1 cylinder, #3 cylinder, and #5 cylinder are formed. #2 cylinder, #4 cylinder, and #6 cylinder are discontinuous in terms of firing order, and #1 cylinder, #3 cylinder, and #5 cylinder are discontinuous in terms of firing order.

With the intake pipe of engine 10 in the embodiment of the present invention, an airflow between the left and right banks is made smooth so that it is possible to increase an amount of air to be taken in to each of the cylinders. Accordingly, it is possible to improve intake efficiency, and increase power of engine 10.

In the present embodiment, the present invention is applied to engine 10 in which surge tank 21 and intake manifold 15 are separately provided. However, the present invention can also be applied to an engine in which the surge tank and the intake manifold are integrally provided.

Figure 9:
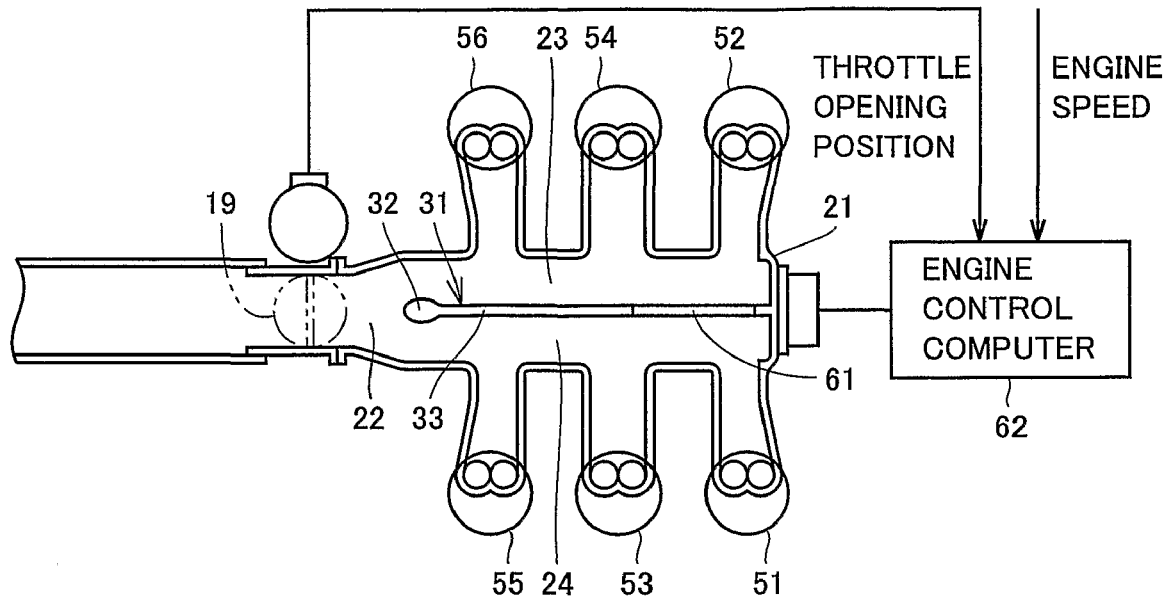
FIG. 9 is a cross sectional view schematically showing the shape of the surge tank used in an example.

An example for verifying the above-described effects will hereinafter be described. FIG. 9 is a cross sectional view schematically showing the shape of a surge tank used for the example.

Referring to FIG. 9, the present example uses an engine having an Acoustic Control Induction System (ACIS) mounted thereon. The ACIS switches back and forth between two lengths of an intake passage from surge tank 21 to intake ports 51-56. Surge tank 21 is provided with an ACIS valve 61, which is controlled to be opened or closed by an engine control computer 62 in accordance with an engine speed and an opening position of throttle valve 19.

By opening ACIS valve 61, upper branch flow passage 23 and lower branch flow passage 24 are brought into communication with each other, and the length of the intake passage is set to be small. By closing ACIS valve 61, upper branch flow passage 23 is shut off from lower branch flow passage 24, and the length of the intake passage is set to be large. With such a configuration, a pulsation effect in the intake passage can be utilized to increase the amount of air to be taken in, and to increase a torque over the entire range from low speed to high speed.

In the present example, an airflow flowing back and forth between upper branch flow passage 23 and lower branch flow passage 24 was generated with ACIS valve 61 closed, and power of the engine was measured while the engine speed was varied. For comparison, a surge tank provided with the plate-like partition wall 131 shown in FIG. 3 was used to perform a similar measurement.

Figure 10:
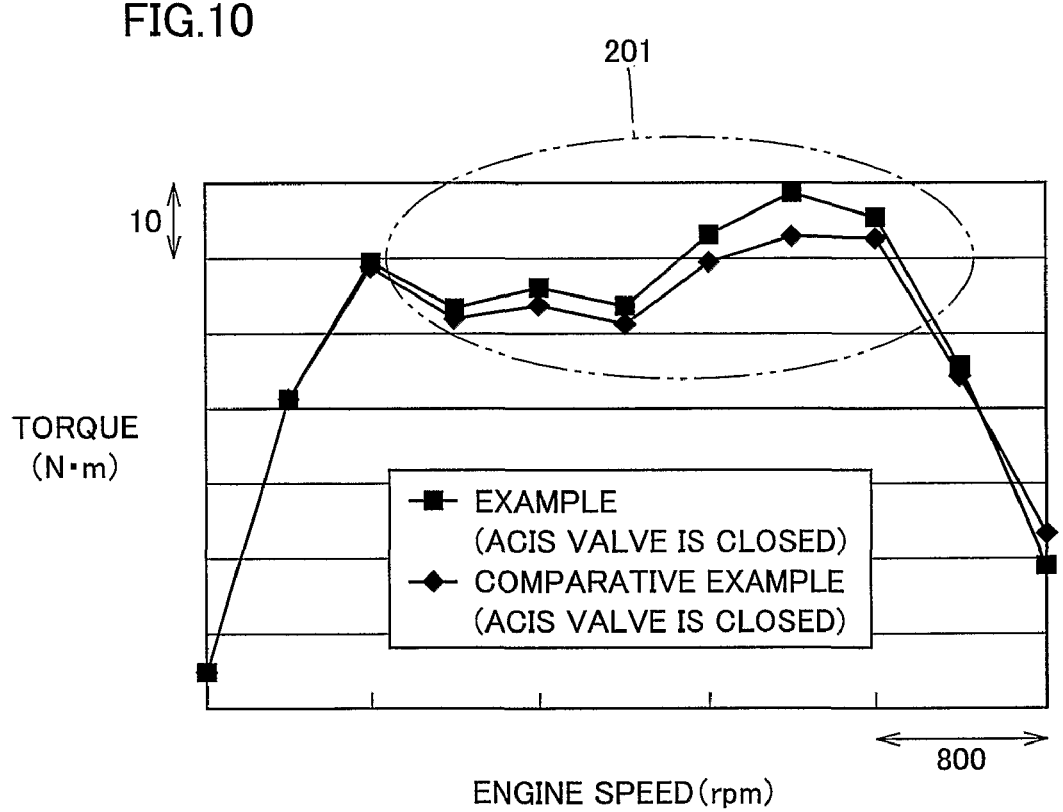
FIG. 10 is a graph showing a relationship between an engine speed and an output torque in the example.

FIG. 10 is a graph showing the relationship between an engine speed and an output torque in the example. As can be seen with reference to FIG. 10, an output torque can be improved by approximately 6 Nm in the speed range surrounded by a dashed two-dotted line 201 in the example, when compared with the case in the comparative example.

It should be understood that the embodiments and examples disclosed here are illustrative in all respects and are not to be taken by way of limitation. The scope of the present invention is not limited by the description above, but by the terms of the appended claims, and all the modifications made within the scope of the claims and the equivalents thereof are intended to be embraced.

INDUSTRIAL APPLICABILITY

The present invention is mainly utilized in a V-type six-cylinder engine provided with right and left banks.

The invention claimed is:

1. An intake pipe of an internal combustion engine, comprising:
    a main flow passage allowing air introduced into the internal combustion engine to flow therethrough;
    a first branch flow passage branching off from said main flow passage and communicating with a first cylinder group;
    a second branch flow passage branching off from said main flow passage and communicating with a second cylinder group; and
    a partition wall allowing said first branch flow passage and said second branch flow passage to be apart,
    said partition wall having an end portion facing said main flow passage, and
    a tip of said end portion having a rounded surface, and said end portion including a portion having a thickness gradually decreased toward a downstream side of an airflow flowing from said main flow passage to each of the cylinder groups.

2. The intake pipe of the internal combustion engine according to claim 1, wherein
    said partition wall further has a base portion extending on a side opposite to said main flow passage with respect to said end portion, and
    the rounded surface forming said end portion continues to said base portion at a boundary location between said end portion and said base portion.

3. The intake pipe of the internal combustion engine according to claim 1, wherein
    said partition wall further has a base portion extending on a side opposite to said main flow passage with respect to said end portion, and having a substantially constant thickness T, and said end portion has a thickness t larger than said thickness T.

4. The intake pipe of the internal combustion engine according to claim 1, wherein
said partition wall further has a base portion extending on a side opposite to said main flow passage with respect to said end portion, and
said end portion is formed of a member different from said base portion, and attached to said base portion.

5. The intake pipe of the internal combustion engine according to claim 1, wherein
the intake pipe is formed by resin molding, and
a first molded portion including said end portion and a second molded portion molded separately from said first molded portion are combined to form said intake pipe.

6. The intake pipe of the internal combustion engine according to claim 1, mounted on a V-type six-cylinder engine provided with a first bank having said first cylinder group formed thereat and a second bank having said second cylinder group formed thereat, said first cylinder group including cylinders discontinuous in terms of firing order and said second cylinder group including cylinders discontinuous in terms of firing order.

* * * * *